Feb. 4, 1958 B. KOPELMAN 2,822,307

TECHNIQUE FOR MULTIPLE P-N JUNCTIONS

Filed April 24, 1953

INVENTOR
BERNARD KOPELMAN
BY
F. Kumpl
ATTORNEY

United States Patent Office 2,822,307

Patented Feb. 4, 1958

2,822,307

TECHNIQUE FOR MULTIPLE P–N JUNCTIONS

Bernard Kopelman, Flushing, N. Y., assignor to Sylvania Electric Products Inc., a corporation of Massachusetts Application April 24, 1953, Serial No. 350,860

18 Claims. (Cl. 148—1.5)

This invention relates to a method of making semi-conductor materials which have a multiple number of P–N junctions.

Since the advent of the transistor and the development of the junction type in place of the pin point or cat whisker type it has been apparent that the processing technique should and could be improved upon considerably to give both a better quality and more economical product. In accordance with one of the better known prior art methods for making germanium transistors, for example, a slab or slice of germanium of one conductivity type is treated with a pellet or powder of a metal or an alloy of a metal with germanium of the opposite conductivity type. The treatment consists in heating the materials whose surfaces are in contact with one another to a temperature at which the applied material diffuses into the surface of the original slice or slab whereupon they are allowed to cool. Upon resolidification a P–N junction will have formed at the surface. Although it is possible to make the P–N type junction by this method as has been evidenced by the prior art, this method is not satisfactory from an overall standpoint in view of the fact that it is quite complicated and does not permit any real control to be exercised over the thickness of the basis metal after the material with the second type of conductivity has been applied and diffused into it. Furthermore, it does not permit a good control to be exercised over the thickness of the applied materials.

It is, accordingly, an object of this invention to provide an improved method of fabricating transistors.

It is a further object of this invention to provide an improved technique whereby a multiple number of P–N junctions can be formed simultaneously.

It is a still further object of this invention to permit the formation of a number of P–N junctions with semi-conductor materials in which the various dimensions can be subject to accurate control.

It has been found that these objects and other advantages incidental thereto can be obtained in accordance with the principles of this invention if slices of an alloy of a semi-conductor material having a melting point substantially higher than that of the unalloyed semi-conductor material of the opposite conductivity type are stacked in alternate layers with the unalloyed semi-conductor material and the entire mass is then brought up to a temperature higher than the melting point of the lower melting material but lower than the melting point of the higher melting material.

Figure 1:
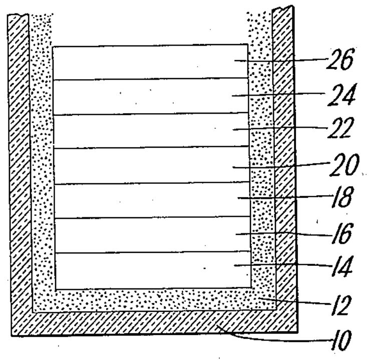

In the drawings which illustrate features of this invention Figure 1 is a front elevation showing the manner in which the materials are stacked into a crucible preparatory to making the finished product.

Figure 2:
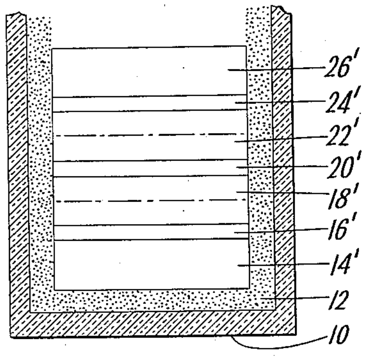

Figure 2 of the drawings illustrates the crucible containing the materials after they have been brought up to the proper heat and permitted to cool.

The method of this invention which is to be described in specific detail with respect to germanium but which method can also be applied with equal success to a semi-conductor material such as silicon is based upon the fact that the melting point of germanium increases markedly with small additions of silicon. Materials other than silicon could also be used for this purpose provided they increased or decreased the melting point of the semi-conductor which is to be used as the base metal a sufficient amount. Furthermore, the materials should preferably be inert so as not a destroy the semi-conducting properties of the base semi-conductor material. The so-called impurity materials such as antimony (a donor impurity) and indium (an acceptor impurity) which are usually used for doping of the semi-conductor materials are not of the type which are herein contemplated for effecting the modification in the melting point. The amount of doping agent such as antimony or indium which is used for doping affects the melting point to such a small degree as to be less than the limits of temperature control at these temperatures and can therefore be neglected. The doping agents or impurities will however be utilized in the slabs or slices to form semi-conductor materials of the desired properties.

The order of temperature change in question can most readily be seen from the following chart which shows the germanium silicon system at the germanium rich end and shows the temperature composition relationship to be as follows:

| Composition—Atomic Percent | Solidus Temperature, ° C. | Liquidus Temp., ° C. |
|---|---|---|
| 100% Ge | 940 | 940 |
| 98% Ge—2% Si | 943 | 980 |
| 95% Ge—5% Si | 950 | 1,020 |
| 90% Ge—10% Si | 962 | 1,070 |

In order to prepare multiple P–N junctions in accordance with this invention one may, for example, prepare a single crystal ingot of 95% germanium, 5% silicon (atomic percent) to which antimony has been added if it is desired to prepare N-type material for the intermediate layer of a P–N–P type junction or indium if it is desired to prepare P-type material for the intermediate layer of an N–P–N type junction. This ingot is then prepared into polished and etched slices of about .03" in thickness which is the usual thickness of wafers used in the preparation of junction type transistors. Along with this is also prepared single crystal slices of pure germanium which have been doped with indium to prepare P-type material for the outer layers of P–N–P junctions or with antimony to prepare N-type material for the outer layers of N–P–N junctions. These slices are also normally prepared with a thickness of .030". With these slices of material at hand it is now possible to place them in a crucible much as is shown in Figure 1 of the drawings which illustrates one embodiment of this invention. As there shown a quartz crucible 10 is lined with quartz powder 12.

The slices of the germanium and germanium silicon alloy are then stacked alternately in the crucible. As there shown in order to produce P–N–P junctions the germanium indium slice 14 is placed at the bottom with a germanium silicon antimony slice 16 placed on top. This latter layer is covered with a germanium indium slice 18 and this again in turn with a germanium silicon antimony slice 20 and this in turn with a germanium indium 22 and a germanium silicon antimony slice 24. A top layer of germanium indium 26 is then placed thereon. After the slices of germanium silicon antimony and germanium indium have been packed in the crucible in alternate layers and completely surrounded by the quartz powder the assembly can now be heated. The slices of germanium indium will melt at 940° C. whereas the slices of germanium silicon antimony in view of the fact that they contain as much as 5% silicon will not melt at all until a temperature of 950° C. is attained and furthermore even if this temperature should be exceeded they will remain mushy without melting until a temperature of 1020° C. is obtained. However, the system should be heated only to about 949° C. which temperature is maintained until equilibrium is reached. During this period the germanium indium slices will melt and dissolve parts of the germanium silicon antimony slices until this liquid phase contains 95.5% germanium and 4½% silicon and, of course, a slight amount of indium and will thereupon stop dissolving the germanium silicon antimony slices. Under this particular condition the germanium silicon antimony slices will have been reduced in thickness from the original .030 down to about .003. The crucible can then be very slowly removed from the furnace in which it has been held under a controlled atmospheric condition, of course.

Upon completion of this heating step slices 24, 20, and 16 will be of the N-type and have a thickness of about .003" whereas slices 26 and 14 of the outer P-type slices will be of about .0435" thick and slices 22 and 18 the inner P-type slices will be .057" thick. These center P-type slices can now be cut transversely through the center. Thereupon one will obtain separate slabs of P–N–P composition with the N-layer .003" and the P layers either .02" thick if from the inner slices or .0435" if from the end slices. These slices can then be further diced if so desired to give numerous P–N–P type transistors of the desired size.

There is, however, one difficulty associated with melting a stack of slices of the type as shown in Figures 1 and 2 of the drawings which is a tendency for the solid slices to float to the surface of the liquidus layer. However, by proper packing of the slices in the quartz the separation of the solid and liquid phases of the germanium will be prevented.

While the above description has spoken of the use of quartz crucible and quartz powder it is, of course, understood that any other material which can withstand the necessary temperatures and which will not poison the materials can be used. For example, a graphite crucible or a graphite powder could readily be substituted for the quartz without any deleterious effects on the end product.

The purpose of the quartz or graphite powder packing is two-fold in this process. First, of course, it prevents the molten layers 26, 22 and 18 from running over the end and causing uneven attack on the unmolten or solid slices 24, 20 and 16. Secondly, it allows for expansion on the freezing of the molten layers and thus minimizes internal strain which might be produced due to expansion or freezing of the components of the transistor.

In order to afford the maximum possibility of obtaining a single crystal after resolidification of the composite mass the alternate slices of P and N material should all be of the same crystal orientation and should preferably be aligned in the same crystal direction before loading the crystals into the crucible.

It is also, of course, obvious that one can choose the final thickness of the N layers or the P layers either by varying the temperature of heating or by varying the percentage of silicon in the P layers. The higher the percentage of silicon in the P layers the less critical will be the temperature control necessary in order to get the desired P–N–P junctions.

As has been previously indicated the inventor's concept is equally applicable to the growth of multiple junctions in silicon, for example. More accurately, in silicon rich, silicon germanium alloys whereupon calcium oxide or quartz powder may be used as the packing material. In this case, of course, the lowering of the melting point of silicon by germanium is utilized rather than the raising of the melting point temperature. When a silicon rich germanium alloy is used as a semi-conductor material the materials are treated in an analogous manner in order to form a P–N–P type junction in silicon. In this case the pure silicon is doped with the material to give an N-type conductivity and the silicon which contains 5% germanium is doped to give a P-type conductivity. The composite mass is heated to a temperature of about 1400° C. assuming that the melting point of pure silicon is 1410° C., the melting point of the 5 atomic percent germanium alloy is 1390° C. and it is desired to obtain an N layer having a .003" thickness. The process can, of course, be suitably controlled in order to obtain the desired N layer thickness and the same freedom in choosing a layer thickness and alloy composition is available as can be had with the germanium rich germanium silicon alloys. Furthermore, it is obvious that the N–P–N junctions either in germanium or silicon alloys can be prepared by inter-changing the doping agents in well known fashion.

While the above description and drawings submitted herewith disclose a preferred and practical embodiment of the technique of multiple P–N junctions of this invention it will be understood that the specific details of construction and arrangement of parts as shown and described are by way of illustration and are not to be construed as limiting the scope of the invention.

What is claimed is:

1. In the method of fabricating junction type transistors the steps comprising assembling slices of semi-conductor materials of opposite conductivity types and different melting points in alternate layers to form a stack, heating said stack to a temperature lying between the melting points of said semi-conductor materials, holding the stack at this temperature until equilibrium is reached and allowing the heated stack to cool.

2. In the method of fabricating junction type transistors the steps comprising assembling slices of semi-conductor materials of opposite conductivity types and different melting points in alternate layers to form a stack, placing the stack in a quartz crucible, surrounding the stack with quartz powder, heating said stack to a temperature lying between the melting points of semi-conductor materials, holding the stack at this temperature until equilibrium is reached and allowing the heated stack to cool.

3. In the method of fabricating junction type transistors the steps comprising assembling slices of a germanium rich silicon alloy containing antimony as an impurity and germanium containing indium as an impurity in alternate layers to form a stack, heating said stack to a temperature lying between the melting points of the two semi-conductor materials holding the stack at this temperature until equilibrium is reached and allowing the heated stack to cool.

4. In the method of fabricating junction type transistors the steps comprising assembling slices of a germanium silicon alloy containing approximately 5% silicon and antimony as an impurity and germanium containing indium as an impurity in alternate layers to form a stack, heating said stack to a temperature lying between the melting point of said semi-conductor materials holding the stack at this temperature until equlibrium is reached and allowing the heated stack to cool.

5. In the method of fabricating junction type transistors the steps comprising assembling slices of a germanium silicon alloy containing approximately 5% silicon and antimony as an impurity and germanium containing indium as an impurity in alternate layers to form a stack, heating said stack to 949° C., holding the stack at this temperature until equilibrium is reached and allowing the heated stack to cool.

6. In the method of fabricating junction type transistors the steps comprising assembling slices of a germanium silicon alloy containing approximately 5% silicon and antimony as an impurity and germanium containing indium as an impurity in alternate layers to form a stack, inserting said stack in a quartz crucible, packing quartz powder between the stack and the crucible walls, heating said stack to a temperature lying between the melting points of said semi-conductor materials, holding the stack at this temperature until equilibrium is reached and allowing the heated stack to cool.

7. In the method of fabricating junction type transistors the steps comprising assembling slices of a germanium silicon alloy containing approximately 5% silicon and antimony as an impurity and germanium containing indium as an impurity in alternate layers to form a stack, inserting said stack in a graphite crucible, packing graphite powder between the stack and the crucible walls, heating said stack to a temperature lying between the melting points of said semi-conductor materials, holding the stack at this temperature until equilibrium is reached and allowing the heated stack to cool.

8. In the method of fabricating junction type transistors the steps comprising assembling slices of a germanium rich silicon alloy containing antimony as an impurity and germanium containing indium as an impurity in alternate layers to form a stack, inserting said stack in a quartz crucible, packing quartz powder between the stack and the crucible walls, heating said stack to a temperature lying between the melting points of the two semi-conductor materials, holding the stack at this temperature until equilibrium is reached and allowing the heated stack to cool.

9. In the method of fabricating junction type transistors the steps comprising assembling slices of semi-conductor materials of opposite conductivity type and different melting points in alternate layers to form a stack, inserting said stack in a graphite crucible, packing graphite powder between the stack and the crucible walls, heating said stack to a temperature lying between the melting points of said semi-conductor materials, holding the stack at this temperature until equilibrium is reached and allowing the heated stack to cool.

10. In a method of fabricating junction type transistors the steps comprising assembling slices of a silicon germanium alloy rich in silicon and containing antimony as an impurity and silicon containing indium as an impurity in alternate layers to form a stack, heating said stack to a temperature lying between the melting points of semi-conductor materials, holding the stack at this temperature until equilibrium is reached and allowing the heated stack to cool.

11. In the method of fabricating junction type transistors the steps comprising assembling slices of a silicon germanium alloy rich in silicon and containing a donor metal as an impurity and silicon containing an acceptor metal as an impurity in alternate layers to form a stack, heating said stack to a temperature lying between the melting points of semi-conductor materials, holding the stack at this temperature until equilibrium is reached and allowing the heated stack to cool.

12. In the method of fabricating junction type transistors the steps comprising assembling slices of a silicon germanium alloy rich in silicon and containing an acceptor metal as an impurity and silicon containing a donor metal as an impurity in alternate layers to form a stack, heating said stack to a temperature lying between the melting points of semi-conductor materials, holding the stack at this temperature until equilibrium is reached and allowing the heated stack to cool.

13. In the method of fabricating junction type transistors the steps comprising assembling slices of a germanium rich silicon alloy containing a donor metal as an impurity and germanium containing an acceptor metal as an impurity in alternate layers to form a stack, heating said stack to a temperature lying between the melting points of the two semi-conductor materials, holding the stack at this temperature until equilibrium is reached and allowing the heated stack to cool.

14. In the method of fabricating junction type transistors the steps comprising assembling slices of a germanium rich silicon alloy containing an acceptor metal as an impurity and germanium containing a donor metal as an impurity in alternate layers to form a stack, heating said stack to a temperature lying between the melting points of the two semi-conductor materials, holding the stack at this temperature until equilibrium is reached and allowing the heated stack to cool.

15. In the method of fabricating junction type transistors the steps comprising assembling slices of a silicon germanium alloy containing approximately 5% germanium and antimony as an impurity and silicon containing indium as an impurity in alternate layers to form a stack, heating said stack to a temperature of about 1400° C., holding the stack at this temperature until equilibrium is reached and allowing the heated stack to cool.

16. In the method of fabricating junction type transistors the steps comprising assembling slices of a silicon germanium alloy containing approximately 5% germanium and antimony as an impurity and silicon containing indium as an impurity in alternate layers to form a stack, inserting said stack in a quartz crucible, packing quartz powder between the stack and the crucible walls, heating said stack to a temperature of about 1400° C., holding the stack at this temperature until equilibrium is reached and allowing the heated stack to cool.

17. In the method of fabricating junction type transistors the steps comprising assembling slices of semi-conductor materials of opposite conductivity types and different melting points in alternate layers to form a stack, placing the stack in a quartz crucible, surrounding the stack with quartz powder, heating said stack to a temperature lying between the melting points of the semi-conductor materials, holding the stack at this temperature until equilibrium is reached and allowing the heated stack to cool, and severing the stack transversely thereof along a line intermediate a slice within the stack of composition corresponding to an end slice to provide a plurality of slabs of multiple P–N composition.

18. In the method of fabricating junction type transistors the steps comprising assembling slices of a first semi-conductor material of one conductivity type and slices of a second semi-conductor material of opposite conductivity type in alternate layers to form a stack, said second semi-conductor material comprising an alloy of the same material as said first semi-conductor material with another material capable of altering the melting point of said first material, heating said stack to a temperature lying between the melting points of said first and second semi-conductor materials, holding the stack at this temperature until equilibrium is reached and allowing the heated stack to cool.

References Cited in the file of this patent

UNITED STATES PATENTS

| | | |
|---|---|---|
| 2,555,001 | Ohl | May 29, 1951 |
| 2,561,411 | Pfann | July 24, 1951 |
| 2,569,347 | Shockley | Sept. 25, 1951 |
| 2,629,672 | Sparks | Feb. 24, 1953 |
| 2,701,326 | Pfann | Feb. 1, 1955 |
| 2,708,646 | North | May 17, 1955 |
| 2,721,965 | Hall | Oct. 25, 1955 |

FOREIGN PATENTS

| | | |
|---|---|---|
| 375,304 | Great Britain | June 16, 1932 |

OTHER REFERENCES

Journal of Applied Physics, 1953, vol. 24, page 224.